US012219323B2

(12) United States Patent
Best et al.

(10) Patent No.: US 12,219,323 B2
(45) Date of Patent: Feb. 4, 2025

(54) HEARING DEVICE AND METHOD FOR OPERATING A HEARING DEVICE

(71) Applicant: SIVANTOS PTE. LTD., Singapore (SG)

(72) Inventors: Sebastian Best, Erlangen (DE); Cecil Wilson, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 281 days.

(21) Appl. No.: 17/970,762

(22) Filed: Oct. 21, 2022

(65) Prior Publication Data

US 2023/0129796 A1 Apr. 27, 2023

(30) Foreign Application Priority Data

Oct. 21, 2021 (DE) .................... 10 2021 211 879.8

(51) Int. Cl.
*H04R 25/00* (2006.01)
*H04R 1/10* (2006.01)

(52) U.S. Cl.
CPC ......... *H04R 25/505* (2013.01); *H04R 1/1083* (2013.01); *H04R 2225/41* (2013.01); *H04R 2225/43* (2013.01)

(58) Field of Classification Search
CPC .............. H04R 1/1083; H04R 2225/41; H04R 2225/43; H04R 2430/03; H04R 25/505
USPC .......................................................... 381/312
See application file for complete search history.

(56) References Cited

U.S. PATENT DOCUMENTS

| | | | |
|---|---|---|---|
| 10,225,667 | B2 | 3/2019 | Puder |
| 2013/0156208 | A1 | 6/2013 | Banba et al. |
| 2015/0005845 | A1 | 1/2015 | Fruehauf et al. |
| 2015/0181356 | A1 | 6/2015 | Krystek et al. |
| 2021/0076146 | A1 | 3/2021 | Naumann et al. |

FOREIGN PATENT DOCUMENTS

| | | | | |
|---|---|---|---|---|
| DE | 102015204253 | A1 | 9/2016 | |
| EP | 3340657 | A1 * | 6/2018 | ............ G10L 25/84 |
| EP | 3793209 | A1 | 3/2021 | |

* cited by examiner

*Primary Examiner* — Phylesha Dabney
(74) *Attorney, Agent, or Firm* — Laurance A. Greenburg; Werner H. Stemer; Ralph E. Locher

(57) ABSTRACT

A hearing device includes at least one microphone configured to capture sound signals within an overall frequency range and to convert them into an input signal. A signal processor is provided for processing the input signal within a lower frequency range that is part of an overall frequency range. A detector is provided for detecting a noise that has frequency components both inside and outside the lower frequency range, namely in an upper frequency range above the lower frequency range. The hearing device is configured in such a way that the detector detects the noise based on its frequency component in the upper frequency range. A method for operating a hearing device is also provided.

15 Claims, 2 Drawing Sheets

HEARING DEVICE AND METHOD FOR OPERATING A HEARING DEVICE

CROSS-REFERENCE TO RELATED APPLICATION

This application claims the priority, under 35 U.S.C. § 119, of German Patent Application DE 10 2021 211 879.8, filed Oct. 21, 2021; the prior application is herewith incorporated by reference in its entirety.

FIELD AND BACKGROUND OF THE INVENTION

The invention relates to a hearing device as well as a method for operating such a hearing device.

A hearing device is generally used to output sound signals to a user of the hearing device. Specifically in the case of a hearing aid for treating a user who has a hearing deficit, the hearing device is configured to capture sound signals from the environment, process them and finally output them in a modified form (i.e. typically amplified), in such a way that the hearing deficit is at least partially compensated.

In a given environment, there are usually both useful sounds and interfering sounds, or noise. The former should be reproduced in a way that is as intelligible to the user as possible, while the latter should be suppressed as extensively as possible in order to improve the operation of the hearing device and its benefit for the user. However, effective suppression of noise requires the noise signals to be detected as effectively as possible. Basically, there are different types of noise, which are detected with different degrees of difficulty. Noise signals may differ e.g. in terms of their bandwidth, amplitude and/or position in an overall frequency spectrum that is captured by the hearing device. Examples of different types of interfering sounds are, accordingly, stationary noise (i.e. narrow-band with little temporal variability), non-stationary and specifically transient and/or impulse-like noise (i.e. wideband with high temporal variability), loud noise (i.e. with high amplitude), quiet noise (i.e. with low amplitude), high-frequency noise (with predominantly high-frequency components), and low-frequency noise (with predominantly low-frequency components). Examples of non-transient interfering sounds are stationary noise, such as a fan, or interfering music or interfering speech in the background, typically referred to as a "cocktail party" situation.

During operation of a hearing device, the suppression of interfering sounds, in particular transient and/or impulse-like sounds, depends on their reliable detection. A hearing device normally works in a specific frequency range, the so-called operating range, in which the input signal is modified in order to be adapted for the user, preferably to compensate for a hearing deficit of the user. For a corresponding modification of the input signal by the signal processor, an audiogram of the user, which is limited to the operating range, is preferably stored in the hearing device. Outside the operating range, in particular no modification of the input signal takes place, at least no active modification to compensate for a hearing deficit of the user. The operating range is normally only a sub-range of the acoustic frequency spectrum. This acoustic frequency spectrum is defined in particular as the frequency range from 20 Hz to 20 kHz. This limitation to a sub-range of the acoustic frequency spectrum is typically caused by technical constraints of the hearing device, as it cannot normally process arbitrarily high frequencies.

In the operating range the detection of noise occurs in such a way that, for example, particularly loud frequency components, i.e. those with a specified minimum amplitude, are detected as noise. For example, a noise is detected by detecting that the minimum amplitude has been exceeded in one or more frequency ranges. In order to suppress the noise, for example, the amplification by the hearing device is then reduced in these frequency ranges so that the noise is then amplified to a lesser degree than useful sounds in other frequency ranges.

However, it is problematic to detect noises that have a comparatively low amplitude, i.e. an amplitude that is comparable to or lower than the possible or usual amplitude of useful sounds. Such noise is also referred to as "quiet noise," "lower-level noise" or "soft noise". These quiet noises are only poorly detected, or not at all, by a detector which relies on a specified minimum amplitude to be exceeded for the detection. The minimum amplitude is advantageously chosen sufficiently high that as far as possible the useful sounds, especially speech, are not degraded. For example, speech typically also has transient and/or impulse-like components, but it constitutes a useful sound and not an interfering sound and should therefore be preserved. The detector can therefore ultimately only detect noises above a specific loudness, i.e. the minimum amplitude cannot be chosen arbitrarily low. Thus, the detector is only poorly able to detect noises that have a comparatively low amplitude, specifically an amplitude in the range of typical amplitudes for speech. Accordingly, when suppressing noises, a conflict arises between exerting the minimum possible influence on useful sounds, in particular speech, due to misrecognition on the one hand and suppression of quiet noises on the other.

Various hearing aids are described in U.S. Publication No. 2013/0156208 A1; European Application EP 3 793 209 A1, corresponding to U.S. Publication No. 2021/0076146 A1; and German Application DE 10 2015 204 253 A1, corresponding to U.S. Pat. No. 10,225,667 B2.

SUMMARY OF THE INVENTION

It is accordingly an object of the invention to provide a hearing device and a method for operating a hearing device, which overcome the hereinafore-mentioned disadvantages of the heretofore-known devices and methods of this general type and which improve the detection of noise during operation of a hearing device. In particular, the object is to improve the detection of quiet noises.

The object is achieved according to the invention by a hearing device having the features described below and by a method having the steps described below. Advantageous embodiments, extensions and variants form the subject matter of the dependent claims. The comments in relation to the hearing device also apply, mutatis mutandis, to the method. Where steps of the method are specified in the following, the preferred embodiments of the hearing device arise due to its being configured to carry out one or more of these steps, in particular by using a control unit that is part of the hearing device.

A core concept of the invention is, in particular, to perform the detection of noise in a frequency range in which the conflicting requirements in the configuration of a detector for the noise are resolved by the fact that there is either no or only a small amount of useful sound in that range. This means that a lower minimum amplitude can advantageously be used for detection than in a frequency range in which useful sound is expected, without significantly increasing the risk of mis-detections. In this way, even quiet noises are better detected, at least such quiet noises which have frequency components in the given frequency range. This is particularly the case for wideband noises, in particular transient and/or impulse-like noises, which normally exhibit frequency components in an upper frequency range outside an operating range (in particular as described above) of a hearing device and/or outside a speech frequency range.

Therefore, a hearing device according to the invention has at least one microphone which is configured to capture sound signals within an overall frequency range and convert them into an input signal. Furthermore, the hearing device has a signal processor for processing the input signal within a lower frequency range that is part of the overall frequency range. Thus, the hearing device has an operating range (in particular as described above), which contains at least, and preferably only, the lower frequency range. The hearing device also has a detector for detecting a noise that has frequency components both within the lower frequency range and outside the same, namely in an upper frequency range above the lower frequency range. Preferably, the upper frequency range is directly adjacent to the lower frequency range, but this is not mandatory. The hearing device is also configured in such a way that the detector detects the noise based on its frequency component in the upper frequency range. In particular, this implements the core idea described above. Overall, the hearing device is thus configured to detect a noise during operation.

For the sake of simplicity, this description uses the term "detecting a noise," but this is understood more precisely to mean that an interference signal is detected in the input signal, which results from an acoustic noise signal that is part of the sound signals of the environment. As a result, a noise is detected in the environment.

In particular, the upper frequency range and the lower frequency range do not overlap. The upper frequency range is preferably not part of the operating range, but this is not mandatory in itself, so that an embodiment is also possible and suitable in which the operating range also entirely or partially contains the upper frequency range. First of all, it is more important that the upper frequency range is characterized by the fact that there are and/or can be expected to be fewer useful sounds in this upper frequency range than in the lower frequency range. In other words, in the upper frequency range, the SNR (signal-to-noise ratio) is greater especially for the above-mentioned quiet noises than in the lower frequency range (when calculating the SNR, the noise under consideration is the "signal" and all other sounds and noises form the "noise"). Outside the lower frequency range, the proportion of speech is also typically particularly small, so that mis-detections are efficiently reduced.

The invention is based in particular on the consideration that sound signals in general and interfering sounds in particular are not limited to the operating range of the hearing device, but can also lie outside it while still being within the acoustic frequency spectrum mentioned earlier (defined from 20 Hz to 20 kHz). In particular transient and/or impulse-like interfering sounds are wideband in nature and thus span a broad frequency range, thus also having high-frequency components that are typically outside the operating range (the terms "component" and "frequency component" are generally considered to be equivalent and are used interchangeably). A noise is designated as wideband in particular if the associated frequencies span a frequency range of at least one octave. The detection of such noises is unreliable in particular if the detection is performed at low frequencies, specifically in the operating range of the hearing device, where other stationary and non-stationary noises are often present that are often louder, i.e. have a higher amplitude. In addition, non-stationary components of speech can lead to cases of misrecognition, i.e. speech, which is actually a useful sound, being incorrectly detected as noise.

However, it has been observed that the amplitude of high-frequency noises (i.e. noises with a high-frequency component) is often lower than the amplitude of low-frequency noises, i.e. noises that are typically within the operating range. For example, in a restaurant or cafeteria, cutlery and crockery may produce a clinking sound (also called "cling-clang sound"), which is a quiet, transient and/or impulse-like noise and thus also has a high-frequency component that is normally outside the operating range. Such noises in particular are then better detected by the hearing device according to the invention, since quiet noises are also detected in the upper frequency range. The risk of mis-detections is thus significantly reduced, as little or no noise is to be expected in the upper frequency range since these are mainly or exclusively located in the lower frequency range.

An advantage of the invention is that quiet, transient and/or impulse-like noises can be detected more easily. This results from detecting them by monitoring the upper frequency range specifically. A transient and/or impulse-like noise is therefore detected based on its frequency component outside the lower frequency range, thus avoiding the problems described when the detection is performed within this lower frequency range. This exploits the fact that the noise is wideband and has frequency components in both the lower and the upper frequency range.

The noise is preferably suppressed by the signal processing and then, if applicable, only within the lower frequency range and not necessarily in the upper frequency range. It is assumed that the noise that is detected in the upper frequency range is wideband and extends to the lower frequency range. Which frequency components in the lower frequency range are effectively suppressed when detecting a noise in the upper frequency range is determined in advance, for example by experiment, or estimated using typical bandwidths of noises which also contain components in the upper frequency range. Also suitable is an embodiment which simply performs suppression over a fixed frequency range within the lower frequency range, without actual knowledge of whether the noise is actually included in it. This uses the knowledge that the noise has a wide frequency spectrum and only exists for a short time and is therefore very likely to be within the pre-defined frequency range. The pre-defined frequency range is, for example, 1 kHz to 5 kHz extending into the lower frequency range from an upper limit of the range. In another suitable embodiment the interference noise is suppressed by averaging and thereby smoothing the input signal as a whole over a certain period of time from e.g. 1 s to 5 s. However, the details of the noise suppression are not important in this case, but rather the most reliable method possible for detecting noise.

Also advantageous is an embodiment in which, in addition to the aforementioned detector (first detector), another, second detector, e.g. a pulse detector, monitors the lower frequency range and then a triggering of this second detector is required as an additional criterion for suppression in order to ensure that a corresponding noise is actually present. For example, suppression occurs only if a transient and/or impulse-like noise is detected both in the upper frequency range by the first detector and in the lower frequency range by the second detector. For this detector, the lower frequency range is conveniently more coarsely divided than for the signal processing, e.g. only into two frequency bands, for example a first frequency band from 100 Hz to 1000 Hz and a second frequency band from 1000 Hz to 12 kHz.

The hearing device is preferably used to treat a hearing-impaired user, i.e. a user with a hearing deficit. To this end, the hearing device has the microphone mentioned above, which captures sound signals from the surroundings and generates an electrical input signal. This is fed to the signal processor, also mentioned above, for processing. Preferably, the signal processor is part of a control unit of the hearing device. The processing takes place in particular on the basis of an individual audiogram of the user, which is assigned to the hearing device so that an individual hearing deficit of the user is compensated. Preferably, the processing is therefore an amplification. The signal processor outputs an electrical output signal, which is then output to the user by a receiver of the hearing device, e.g. again as a sound signal which is generated from the output signal by the receiver.

Alternatively, the hearing device may simply be formed of a set of headphones and then, for the targeted suppression of noises, it preferably includes a noise cancellation facility which benefits accordingly from the improved detection of noises.

The exact configuration of the detector is not the most relevant issue; more important is the fact that it operates in the upper frequency range and searches for a noise there. In principle, a conventional detector is suitable, which would otherwise be used on the lower frequency range but now monitors the upper frequency range instead. For example, limiting the detector to the upper frequency range is achieved by having the detector only monitor the upper frequency range or only feeding the upper frequency range to the detector.

In a suitable embodiment, the hearing device has a filter bank that divides the input signal into a number of channels, each of which is assigned to one frequency band. The filter bank is either integrated into the signal processor or is configured separately from it. The filter bank has a plurality of channels, in particular at least three, but typically a two-digit number. A first subset of the channels then forms the lower frequency range and a second, other subset of the channels analogously forms the upper frequency range, which is then fed to the detector. Regardless of this, a filter bank is also advantageous for suppressing the noise, because the gain can then be set specifically in each individual channel, so that precisely those components that belong to a noise are specifically reduced. An embodiment is also possible in which the filter bank is limited to the lower frequency range and the upper frequency range is routed past the filter bank to the detector.

Conveniently, the detector is a pulse detector, preferably a gradient-based pulse detector. For a gradient-based pulse detector. This is characterized in particular by the fact that it detects transient and/or impulse-like noise on the basis of a specific temporal increase in amplitude.

In a suitable embodiment, the detector is configured as a level detector and therefore detects the noise as such if its amplitude in the upper frequency range exceeds a minimum amplitude. The minimum amplitude depends on the individual preference and the hearing deficit of the user and can be conveniently adjusted by the user. The detector therefore triggers when the minimum amplitude in the upper frequency range is exceeded, and thus detects a noise. In particular, the minimum amplitude is chosen lower (e.g. half the size) than a minimum amplitude which would be selected for a detector that monitors the lower frequency range.

Alternatively or additionally the detector is suitably configured as a gradient detector and thus detects the noise as such if the amplitude thereof in the upper frequency range undergoes a minimum change during a predefined time interval. The gradient detector therefore monitors how much the amplitude changes (e.g. increases) over a predefined time interval, so that the detector only triggers if the amplitude performs at least one minimum change (i.e. a minimum amplitude change) during this predefined time interval. The predefined time interval depends in particular on a sample rate for the input signal in the hearing device and is in the range from 1 ms to 20 ms, for example. The minimum change is just as individual as the minimum amplitude, the above comments thus apply analogously.

Also suitable is an embodiment in which the detector is alternatively or additionally configured as a wavelet detector and thus detects the noise as such on the basis of its spectral shape. The spectral shape is in particular the frequency-dependent amplitude characteristic of the noise. In order to detect the noise, a wavelet is specified which is an ideal form of the spectral shape and which is then compared with the actual noise, in particular by correlating the wavelet with the noise. The more the wavelet correlates with the noise, the more the noise corresponds to the wavelet. This is basically similar to an image comparison. In this way, specific noises, the spectral shape of which is basically known, can be searched for and detected. For example, a single pulse is used as the wavelet.

A second detector for the lower frequency range is not necessary in this case, but is advantageous in addition to the first detector described herein for the upper frequency range, e.g. to detect narrow-band noises in the lower frequency range, which in particular is not possible with the detector described herein. Accordingly, the second detector for the lower frequency range, if configured as a level detector, has a higher minimum amplitude than the detector for the upper frequency range. Due to the problem described above, detecting noises in the lower frequency range requires a minimum amplitude which is greater than the usual or maximum achievable amplitude of useful sounds in the lower frequency range. Since there are no or only few useful sounds in the upper frequency range, in this case a correspondingly lower minimum amplitude is possible and even advantageous, because then quiet noises can also be better detected. In addition, the comments in relation to the first detector also apply analogously to the optional second detector.

As already indicated, the noise that can be detected with the detector is preferably a transient and/or impulse-like noise. Such a noise is wideband and therefore normally has components in the upper frequency range (and typically also in the lower frequency range), and hence it can be detected there with the detector. At the same time, such noises are often quiet, i.e. so quiet that they are not necessarily reliably detectable in the lower frequency range.

In an advantageous embodiment, the noise is or will be produced by clinking of dishes and/or cutlery. This generation mechanism produces a specific frequency spectrum for the noise, i.e. when viewed in the frequency domain the noise has a characteristic profile, namely a broad spectrum and a low amplitude, because the noise is a quiet, transient and/or impulse-like noise. The characteristic profile in the frequency domain has already been mentioned above in connection with a wavelet detector and is referred to there as spectral shape; both designations are equivalent to each other.

In detail, however, the profile (i.e. the spectral shape) of the noise is of minor importance; more important is the impulse-like characteristic of the noise. Such noises are often very loud and yet difficult to detect, because in the frequency range of a hearing aid (e.g. 100 Hz to 10 kHz) other transient and/or impulse-like sounds also occur which are not noise, but in fact useful sounds (e.g. plosives in speech) and should not be suppressed. It is therefore primarily important to differentiate between intended and unwanted transient and/or impulse-like sounds, i.e. between transient and/or impulse-like useful sounds on the one hand and transient and/or impulse-like noises on the other.

As mentioned above, the upper frequency range is preferably not part of the operating range of the hearing device. To this end, in a suitable embodiment the lower frequency range is an operating range of the signal processor, so that the processing of the input signal by the signal processor is limited to the lower frequency range. In particular, the operating range and the lower frequency range are identical. The processing is preferably an amplification. The signal processor therefore does not process, preferably does not amplify, the upper frequency range, which is only used for the detector and possibly other functions of the hearing device which are of no further relevance in this case. An amplification with the aim of compensating for a hearing deficit of the user is not performed in the upper frequency range, but only in the operating range.

Alternatively or in addition, a speech frequency range is completely or at least predominantly (i.e. in particular to at least 90%) included within the lower frequency range. In particular, the speech frequency range specifies exactly the frequency range within which speech is found. For example, the speech frequency range ranges from 100 Hz to 4 kHz, to 6 kHz, to 8 kHz or to 12 kHz; the higher upper limits apply in particular when overtones are taken into account. The precise definition of the speech frequency range is not the most important issue, however, the more important point being that speech is predominantly or completely included within the lower frequency range and thus is not, or only negligibly, present in the upper frequency range.

Advantageously, the speech frequency range is usually completely covered by the operating range. It is also possible and suitable to configure the operating range and the speech frequency range to have the same upper limit and/or lower limit. However, embodiments are also possible in which the operating range is larger or smaller than the speech frequency range. Specifically in an embodiment in which the operating range also includes the upper frequency range, the operating range is then larger than the speech frequency range, which is preferably limited to the lower frequency range or less.

The upper frequency range advantageously has an upper limit which corresponds to at least an upper limit of the aforementioned speech frequency range. This ensures that there is no incorrect detection of speech as transient and/or pulse-like noise in the upper frequency range.

Preferably, the lower frequency range has an upper limit of 12 kHz, 8 kHz, 6 kHz, or 4 kHz. This upper limit is also preferably, but not necessarily, a lower limit of the upper frequency range. The upper limit of 12 kHz is based on the consideration that speech will then be located completely in the lower frequency range and therefore any mis-detection of noises with the detector on the upper frequency range is avoided. In addition, typical hearing devices usually have an operating range with an upper limit of 12 kHz for the same reason. The lower frequency range also has a lower limit, the exact value of which is not relevant in this case. A suitable lower limit is 20 Hz, for example.

The upper frequency range has an upper limit which is suitably defined by a technical constraint of the hearing device, in particular a limited frequency range of the filter bank and/or a limited sampling rate of an A/D converter (i.e. analog-to-digital converter) that digitizes the input signal from the microphone. In a preferred embodiment, the upper frequency range has a lower limit of 12 kHz and an upper limit of 16 kHz. The lower limit is obtained in particular from the same considerations as the upper limit of the lower frequency range. However, the exact value of the upper limit is basically irrelevant and in a suitable embodiment is generally determined by the technical constraints of the hearing device. The upper limit of 16 kHz specified in this case results in particular from the usual technical constraints of the hearing device, in particular a sampling rate of 32 kHz of an A/D converter of the hearing device.

In a suitable embodiment, the hearing device has an A/D converter for digitizing the input signal, and the upper frequency range has an upper limit which corresponds to no more than half of a sampling rate of the A/D converter. The upper frequency range is thus determined by a technical constraint specified by the A/D converter. Depending on the configuration of the hearing aid, the upper frequency range will be assigned a corresponding upper limit. In a suitable embodiment, the A/D converter has a sampling rate of 32 kHz, so that the upper limit corresponds to a maximum of 16 kHz. In particular, the sampling rate is an actual sampling rate of the A/D converter, i.e. the sampling rate that is actually set. For example, the A/D converter itself has a significantly higher possible sampling rate, e.g. of several MHz, but is operated as an oversampled A/D converter with a significantly lower actual sampling rate of 32 kHz. The sampling rate, specifically the sampling rate actually set for an oversampled A/D converter, is also normally subject to a tolerance, which results in particular due to a deviation of a vibration frequency of a quartz crystal for clocking the A/D converter from an ideal frequency and to a repeated division, in particular by 2, of the vibration frequency down to the sampling rate actually set. In other words, an actual sampling rate of 32 kHz corresponds in reality to a sampling rate of 32 kHz plus or minus a tolerance of e.g. 5%.

The method according to the invention is used to operate a hearing device, in particular a hearing device as described above. The hearing device has a microphone, a signal processor and a detector. In the method, i.e. in the operation of the hearing device, sound signals within an overall frequency range are captured by the microphone and converted into an input signal. Furthermore, the signal processor is used to process the input signal exclusively or at least within a lower frequency range, which is part of the overall frequency range. The detector then detects a noise that has frequency components both inside and outside the lower frequency range, i.e. in an upper frequency range above the lower frequency range, wherein the detector detects the noise based on its frequency component in the upper frequency range. Advantages and preferred extensions arise from what has already been stated above. It is advantageous to suppress the noise in the input signal and to output the input signal by a receiver.

Other features which are considered as characteristic for the invention are set forth in the appended claims.

Although the invention is illustrated and described herein as embodied in a hearing device and a method for operating a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
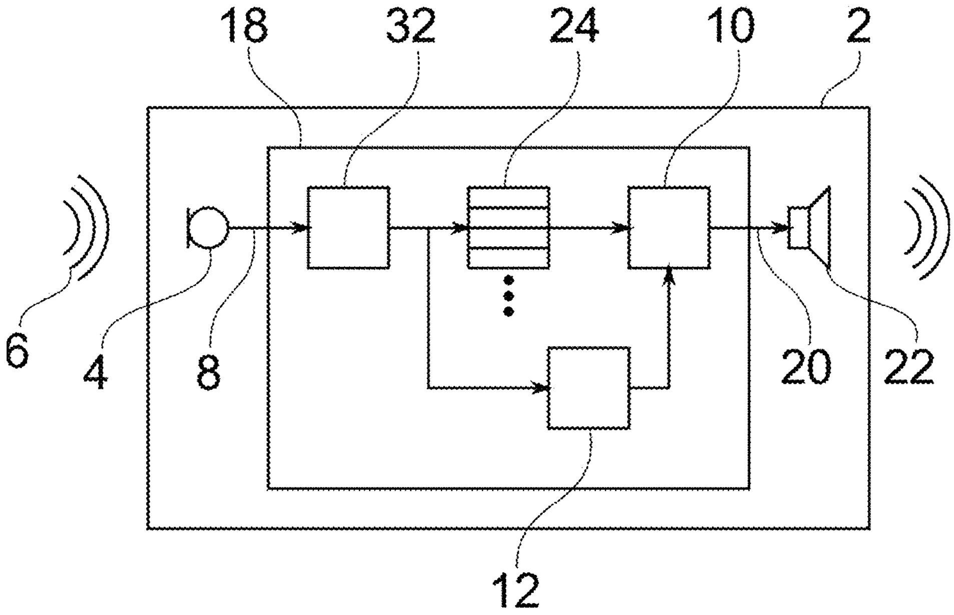
FIG. 1 is a schematic and block diagram of a hearing device.
Figure 2:
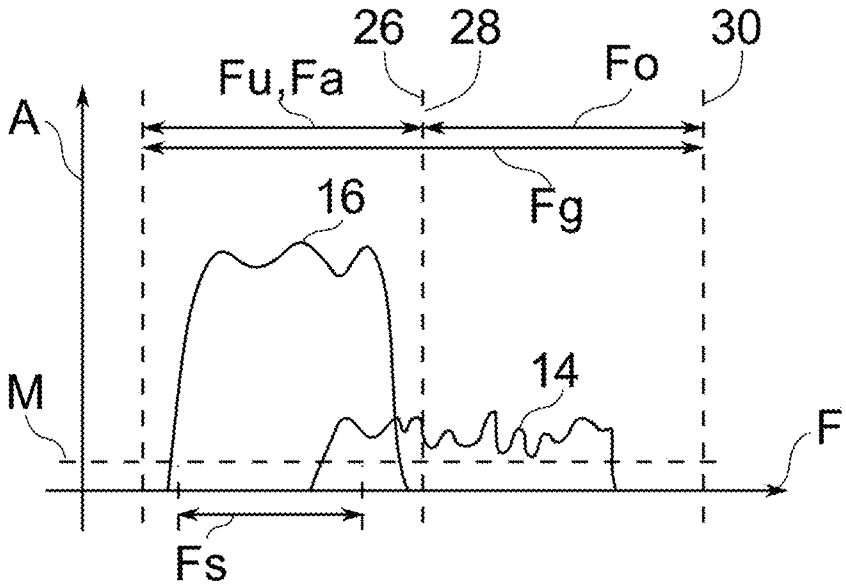
FIG. 2 is a diagram showing a frequency spectrum.

Referring now to the figures of the drawings in detail and first, particularly, to FIG. 1 thereof, there is seen an exemplary embodiment of a hearing device 2 according to the invention. The hearing device 2 has at least one microphone 4, which is configured to capture sound signals 6 within an overall frequency range Fg and convert them into an input signal 8. Furthermore, the hearing device 2 has a signal processor 10 for processing the input signal 8 within a lower frequency range Fu which is part of the overall frequency range Fg. Thus, the hearing device 2 has an operating range Fa, which contains at least—and in the exemplary embodiment shown herein, even exclusively—the lower frequency range Fu. The hearing device 2 also has a detector 12 for detecting a noise 14 which has frequency components both inside the lower frequency range Fu as well as outside the same, namely in an upper frequency range Fo above the lower frequency range Fu. This is illustrated in FIG. 2, which shows an example spectrum of the input signal 8, i.e. its amplitude A as a function of the frequency F. For the sake of clarity, the noise 14 and the useful sound 16 are shown separately, although it is clear that they are mixed to form the input signal 8, possibly with additional useful sounds and/or noises, which are not explicitly shown for the sake of clarity. The hearing device 2 is also configured in such a way that the detector 12 detects the noise 14 based on its frequency component in the upper frequency range Fo.

Preferably, the upper frequency range Fo is directly adjacent to the lower frequency range Fu, but this is not mandatory. In the exemplary embodiment shown, the upper frequency range Fo and the lower frequency range Fo do not overlap. The upper frequency range Fo in this case is also not part of the operating range Fa, but this is not mandatory in itself, so that an embodiment in which the operating range Fa also entirely or partially contains the upper frequency range Fo is also possible and suitable. The upper frequency range Fo is characterized primarily by the fact that fewer useful sounds 16 are present and/or to be expected in this range than in the lower frequency range Fu, as can be seen in the example of FIG. 2. Outside the lower frequency range Fu, the proportion of speech (which is a useful sound 16) is also usually particularly low.

Sound signals 6 in general and noises 14 in particular are not restricted to the operating range Fa of the hearing device 2, but may also be located outside of it. In particular, transient and/or impulse-like noises 14 are wideband and therefore span a broad frequency range, thus they also have high-frequency components that are typically outside the operating range Fa, as is clear from FIG. 2 for the noise 14 shown there (the terms “component” and “frequency component” are generally considered to be equivalent and are used interchangeably). The detection of such noises 14 is unreliable, in particular if the detection is performed at low frequencies, specifically in the operating range Fa of the hearing device 2, where other stationary and non-stationary noises (not explicitly shown in FIG. 2) are often additionally present that are often louder, i.e. have a higher amplitude A. In addition, non-stationary components of speech can lead to cases of misrecognition, i.e. speech, which is actually a useful sound 16, being incorrectly detected as a noise 14.

However, it has been observed that the amplitude A of high-frequency noises 14 is often lower than the amplitude A of low-frequency noises 14, which are typically within the operating range Fa. In a restaurant or cafeteria, for example, when cutlery and crockery are struck together they produce a clinking noise 14, which is a quiet, transient and/or impulse-like noise 14 and also has a high-frequency component that is typically outside the operating range Fa, an example of which is shown in FIG. 2. Such noises 14 in particular are then better detected by the hearing device 2, since quiet noises 14 are also detected in the upper frequency range Fo. The risk of mis-detections is reduced, since little or no useful sounds 16 are expected to occur in the upper frequency range Fo, because these are mainly or exclusively located in the lower frequency range Fu, as can also be seen in FIG. 2. Thus, in the present case quiet, transient and/or impulse-like noises 14 are detected, specifically by monitoring the upper frequency range Fo. A transient and/or impulse-like noise 14 is therefore detected based on its frequency component outside the lower frequency range Fu. This exploits the fact that the noise 14 is wideband and has frequency components in both the lower and the upper frequency range Fu, Fo.

The noise 14 is preferably suppressed by the signal processor 10 and then, if applicable, only within the lower frequency range Fu and not necessarily in the upper frequency range Fo.

The hearing device 2 shown herein is preferably used to treat a hearing-impaired user, i.e. a user with a hearing deficit. To this end, the hearing device 2 has the microphone 4 mentioned above, which captures sound signals 6 from the surroundings and generates the electrical input signal 8. This electrical input signal 8 is fed for processing (in this case specifically, amplification) to the signal processor 10, also mentioned above, which in this case is also part of a control unit 18 of the hearing device 2. The processing is carried out in particular on the basis of an individual audiogram of the user assigned to the hearing device 2, so that an individual hearing deficit of the user is compensated. As a result the signal processor 10 outputs an electrical output signal 20, which is then output to the user by a receiver 22 of the hearing device 2. In a non-illustrated alternative, the hearing device 2 is simply a headset and then, for example, for the specific suppression of noises 14 it has a noise canceling facility, which benefits accordingly from the detection of noises 14 described herein.

The exact configuration of the detector 12 is not relevant in this case, more important is the fact that it operates in the upper frequency range Fo and searches for a noise 14 therein. In principle, a conventional detector 12 is suitable, which would otherwise be used on the lower frequency range Fu but now monitors the upper frequency range Fo instead. A limitation of the detector 12 to the upper frequency range Fo results, for example, from the fact that the detector 12 monitors only the upper frequency range Fo or that only the upper frequency range Fo is fed to the detector 12.

In the embodiment shown herein as an example, the hearing device 2 has a filter bank 24 that divides the input signal into a number of channels, each of which is assigned to a frequency band. The filter bank 24 in this case is configured separately from the signal processor 10, but as an alternative can be integrated into this signal processor 10. The filter bank 24 has a plurality of channels, in particular at least three, but typically a two-digit number. A first subset of the channels then forms the lower frequency range Fu and a second, different subset of the channels analogously forms the upper frequency range Fo, which is then fed to the detector 12. Regardless of this, a filter bank 24 is also advantageous for suppressing the noise 14, because the gain can then be set specifically in each individual channel so that precisely those components that belong to a noise 14 are specifically reduced. An embodiment is also possible in which the filter bank 24 is limited to the lower frequency range Fu and the upper frequency range Fo is routed past the filter bank 24 to the detector 12. This is the case in FIG. 1, according to which the input signal 8 as a whole is fed to the detector 12, which then controls the signal processor 10 to suppress a noise. Alternatively or in addition, the detector 12—as already indicated—controls the filter bank 24 for the suppression. Furthermore, in a non-illustrated variant—as also already indicated—the detector 12 is not supplied with the input signal 8 as a whole, but only the upper frequency range Fo from the filter bank 24.

In this case the detector 12 is configured as a level detector and thus detects the noise 14 as such if the amplitude A thereof in the upper frequency range Fo exceeds a minimum amplitude M. If the minimum amplitude M in the upper frequency range Fo is exceeded, the detector 12 triggers and thus detects a noise 14. The minimum amplitude M is chosen to be lower (e.g. half the size) than a minimum amplitude M which would be selected for a detector that monitors the lower frequency range Fu. A second detector for the lower frequency range Fu is not used in this case, but in a non-illustrated alternative it is present in addition to the detector 12 described herein for the upper frequency range Fo, e.g. to detect narrow-band noises in the lower frequency range Fu, which is not possible with the detector 12 described herein. Accordingly, the detector for the lower frequency range Fu has a higher minimum amplitude M than the detector 12 for the upper frequency range Fo. In order to detect noises 14 in the lower frequency range Fu, however, a minimum amplitude M is required which is greater than the typical or maximum achievable amplitude A of useful sounds 16 in the lower frequency range Fu, as can be seen from FIG. 2. Since there are either no or only few useful sounds 16 in the upper frequency range Fo, in this case a correspondingly lower minimum amplitude M is possible and quiet noises 14 are also better detected.

The detector 12 is a gradient-based detector, for example. It is also possible to implement it as a gradient detector or a wavelet detector, as well as a combination of the embodiments mentioned in this case and above.

As mentioned above, the upper frequency range Fo in the embodiment shown is not part of the operating range Fa of the hearing device 2. To this end, the lower frequency range Fu is an operating range Fa of the signal processor 10, so that the processing of the input signal 8 by the signal processor 10 is limited to the lower frequency range Fu. The signal processor 10 therefore does not process, preferably does not amplify, the upper frequency range Fo, which is only used for the detector 12 and possibly other functions of the hearing device 2 that are of no further relevance in this case. It is irrelevant whether the filter bank 24 only transfers the lower frequency range Fu to the signal processor 10 or whether the signal processor 10 discards the upper frequency range Fu from the signal of the filter bank 24 or simply leaves it unprocessed. An amplification with the aim of compensating for a hearing deficit of the user is not performed in the upper frequency range Fo.

FIG. 2 also shows a speech frequency range Fs, which in this example completely contains the lower frequency range Fu. In particular, the speech frequency range Fs specifies exactly the frequency range within which speech is located. The speech frequency range F in the present case ranges from 100 Hz to 4 kHz or to 12 kHz if overtones are taken into account. The speech frequency range Fs in the present case is completely included within the operating range. In another possible non-illustrated alternative embodiment, the operating range Fa and the speech frequency range Fs have the same upper limit and/or lower limit. However, embodiments are also possible in which the operating range Fa is larger or smaller than the speech frequency range Fs. Specifically in an embodiment in which the operating range Fa also includes the upper frequency range Fo, the operating range Fa is then larger than the speech frequency range Fs.

The lower frequency range Fu has an upper limit 26 of 12 kHz, for example. This upper limit 26 in this case is also, but not necessarily, a lower limit 28 of the upper frequency range Fo.

The upper frequency range Fo has an upper limit 30 which in this case is defined by a technical constraint of the hearing device 2, in particular a limited frequency range of the filter bank 24 and/or a limited sampling rate of an A/D converter 32 (i.e. analog-to-digital converter), which digitizes the input signal 8 from the microphone 4. In the embodiment shown herein, the upper frequency range Fo has a lower limit 28 of 12 kHz and an upper limit 30 of 16 kHz. The lower limit 28 is derived from the same considerations as the upper limit 26 of the lower frequency range Fu. The upper limit 30 of 16 kHz in this case results from the technical constraints of a sampling rate of 32 kHz of the A/D converter 32.

Figure 3:
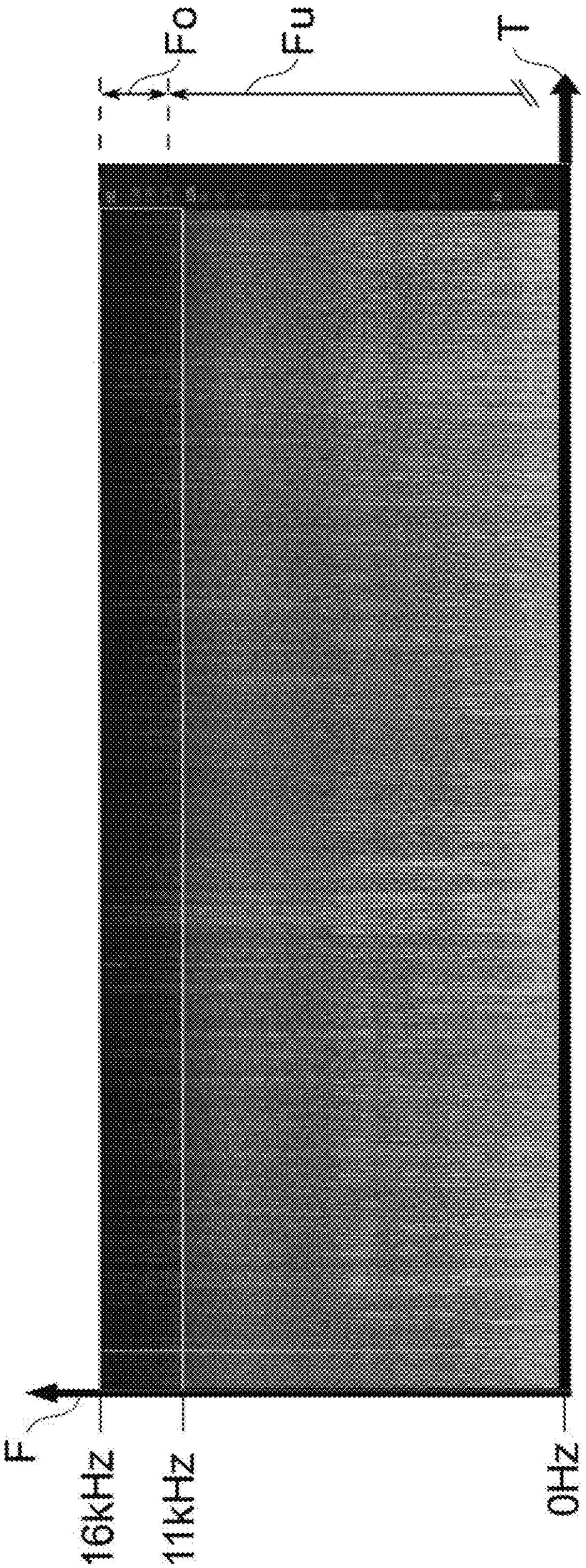
FIG. 3 shows another frequency spectrum.
Figure 4:
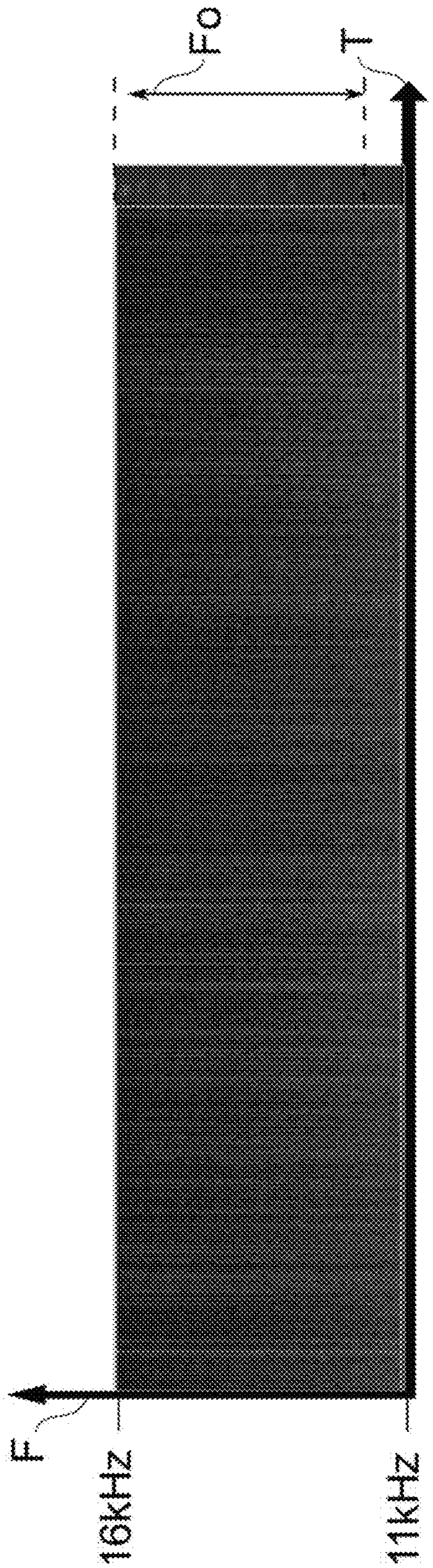
FIG. 4 shows a portion of the frequency spectrum of FIG. 3.

For further illustration, FIG. 3 shows a frequency spectrum in an exemplary environment, in this case a cafeteria. The frequency F is plotted in the vertical direction and the time T is plotted in the horizontal direction. The amplitude A for a given frequency F at a given time T is represented in grayscale, wherein the brighter/whiter the color, the greater the amplitude A and vice versa, the darker/blacker the color, the lower the amplitude A. In FIG. 3, the upper frequency range Fo is enclosed in a frame for identification, the lower frequency range Fu is directly adjacent to it below the upper frequency range Fo. The frame contains the frequency range from 11 kHz to 16 kHz. In FIG. 4, this frequency range is shown enlarged within the frame of FIG. 3, which makes the structure of the upper frequency range Fo more clearly visible. Numerous bright, vertical stripes are clearly visible, i.e. high amplitudes A for short times T only, which result from impulse-like and/or interfering sounds 14.

The following is a summary list of reference numerals and the corresponding structure used in the above description of the invention:

2 hearing device
4 microphone
6 sound signal
8 input signal
10 signal processor

12 detector
14 interfering sound (noise)
16 useful sound
18 control unit
20 output signal
22 receiver
24 filter bank
26 upper limit (of the lower frequency range)
28 lower limit (of the upper frequency range)
30 upper limit (of the upper frequency range)
32 A/D converter
A amplitude
F frequency
Fa operating range
Fg overall frequency range
Fo upper frequency range
Fs speech frequency range
Fu lower frequency range
M minimum amplitude
T time

The invention claimed is:

1. A hearing device, comprising:

at least one microphone configured to capture sound signals within an overall frequency range and to convert the captured sound signals into an input signal;

a signal processor for processing the input signal within a lower frequency range being part of the overall frequency range;

a detector for detecting noise having frequency components both within the lower frequency range and outside of the lower frequency range, namely a frequency component in an upper frequency range above the lower frequency range;

said detector detecting the noise based on the frequency component of the noise in the upper frequency range.

2. The hearing device according to claim 1, wherein said detector is a pulse detector.

3. The hearing device according to claim 1, wherein said detector is configured as a level detector detecting the noise when an amplitude of the noise in the upper frequency range exceeds a minimum amplitude.

4. The hearing device according to claim 1, wherein said detector is configured as a gradient detector detecting the noise when an amplitude of the noise in the upper frequency range executes a minimum change during a predefined time interval.

5. The hearing device according to claim 1, wherein said detector is configured as a wavelet detector detecting the noise based on a spectral shape of the noise.

6. The hearing device according to claim 1, wherein the noise is at least one of a transient or an impulse noise.

7. The hearing device according to claim 1, wherein the noise is caused by clinking at least one of dishes or cutlery.

8. The hearing device according to claim 1, wherein the lower frequency range is an operating range of said signal processor, and the processing of the input signal by said signal processor is limited to the lower frequency range.

9. The hearing device according to claim 1, wherein a speech frequency range is completely or at least predominantly included within the lower frequency range.

10. The hearing device according to claim 1, wherein the upper frequency range has an upper limit corresponding to at least an upper limit of a speech frequency range.

11. The hearing device according to claim 1, wherein the lower frequency range has an upper limit of 12 kHz.

12. The hearing device according to claim 1, wherein the upper frequency range has a lower limit of 12 kHz.

13. The hearing device according to claim 1, wherein the upper frequency range has an upper limit of 16 kHz.

14. The hearing device according to claim 1, which further comprises:

an A/D converter for digitizing the input signal;

said A/D converter having a sampling rate; and the upper frequency range has an upper limit corresponding to no more than half of the sampling rate of said A/D converter.

15. A method for operating a hearing device having at least one microphone, a signal processor, and a detector, the method comprising:

using the microphone to capture sound signals within an overall frequency range and to convert the captured sound signals into an input signal;

using the signal processor to process the input signal within a lower frequency range being part of the overall frequency range;

using the detector to detect a noise having frequency components both inside the lower frequency range and outside of the lower frequency range, namely in an upper frequency range above the lower frequency range; and using the detector to detect the noise based on a frequency component of the noise in the upper frequency range.

* * * * *